Patented Apr. 28, 1931

1,803,202

UNITED STATES PATENT OFFICE

WILHELM NEELMEIER, OF LEVERKUSEN, NEAR COLOGNE-ON-THE-RHINE, AND WINFRID HENTRICH, OF WIESDORF, NEAR COLOGNE-ON-THE-RHINE, GERMANY, ASSIGNORS TO GENERAL ANILINE WORKS, INC., OF NEW YORK, N. Y., A CORPORATION OF DELAWARE

AZO DYESTUFFS DERIVED FROM AMINO-ACYLAMINO-SALICYL-DIPHENYLSULFONES

No Drawing. Application filed May 25, 1927, Serial No. 194,229, and in Germany January 13, 1925.

This invention relates to valuable mordant dyestuffs which contain residues of such amino-derivatives of diphenylsulfones,

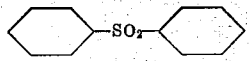

their homologs or substitution products, as have, in the nucleus which does not contain the amino group, an hydroxyl group and a carboxyl group in ortho position to each other.

In our co-pending application Serial No. 146,558, filed Nov. 5, 1926, we have described azo dyestuffs of the general formula:

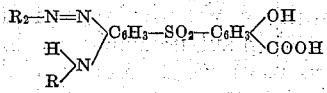

wherein R represents hydrogen or an acidyl group, $R_2$ represents a residue of a coupling compound, and the hydroxyl group and the carboxyl group stand in ortho position to each other; which dyestuffs may be obtained by coupling any desired coupling component with the diazo-compounds of diaminophenyl-salicyl sulfones having the general formula:

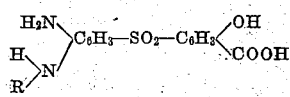

wherein R represents hydrogen or an acidyl group, and the hydroxyl group and the carboxyl group stand in ortho position to each other.

We have now found that similar, improved dyestuffs are obtainable by diazotizing a compound of the general formula:

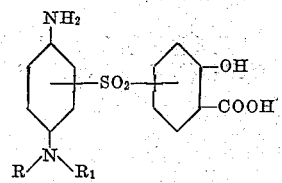

wherein R and $R_1$ stand for alkyl or aralkyl and coupling the diazo compound thus obtained with a coupling component.

The new dyestuffs thus obtainable correspond with the general formula:

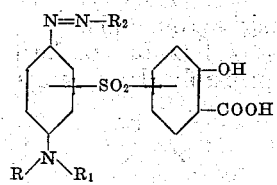

wherein R and $R_1$ represent alkyl or aralkyl and $R_2$ stands for the residue of the coupling component. Said dyestuffs are, when dried and pulverized, generally dark powders readily soluble in water and in sulfuric acid, dyeing chrome mordanted wool red to blue to violet shades of excellent fastness properties to soaping and to fulling. The same shades are obtained when wool dyed with the said dyestuffs is subjected to an after-chroming treatment. The dyestuffs also are suitable for use in cotton printing, due to their fastness properties. Due to the external position of the group producing the mordanting properties, these dyestuffs possess the additional advantage that their dyeings with chroming vary in shade little if at all from the direct dyeings.

As coupling compounds there may be used any of the well known azodyestuffs coupling components, but we have found that very valuable dyestuffs are obtained by the use as coupling compounds of amino-naphthalene sulfonic acids or amino-naphthol sulfonic acids.

Our invention is illustrated by the following example:

336 parts by weight of 2-amino-5-dimethylamino-4'-hydroxy-diphenylsulfon-3'-carboxylic acid are suspended in water at about 50° C. and caustic soda solution is added in quantity sufficient to dissolve the compound. When the compound is dissolved the solution is strongly acidified with 20% hydrochloric acid and a 10% solution of 69 parts by weight of sodium nitrite are slowly added while maintaining the solution at 0° C. and well stirred. The diazo compound forms as a yellowish precipitate, is separated by filtration under suction and is coupled at ordinary temperature with 239 parts by weight of 2-amino-8-hydroxy-naphthalene-6-sulfonic acid in the form of a finely divided suspension in glacial acetic acid containing sodium acetate. The coupling takes place with the production of a violet coloration and when it is complete the dyestuff is separated from the acetic acid and transformed in the usual manner into the sodium or ammonium salt. The dry product is a dark powder with a violet color, readily soluble in water. It is soluble in strong sulfuric acid with a yellowish tinged red color. The new dyestuff gives upon wool in an acid bath a beautiful violet color which by after-treatment with chromium fluoride gives a violet colored dyeing which is fast to fulling and carbonizing. The dyeing is fast to light and not sensitive to metals.

The dyestuff has, in the form of its free acid, most probably the formula:

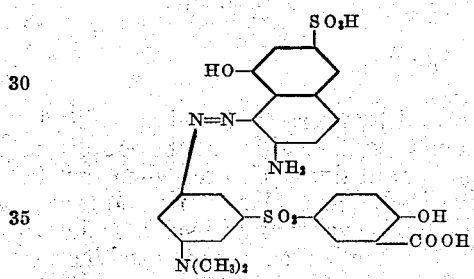

If, instead of the 2-amino-5-dimethylamino-4'-hydroxydiphenylsulfon-3'-carboxylic acid, the corresponding di-ethylamino compound is used, a similar dyestuff is obtained. The use of 2-methylamino-8-hydroxynaphthalene-6-sulfonic acid as a coupling component gives dyestuffs which dye wool a reddish tinged blue color and the dyeings by after-treatment with chromium fluoride, which does not substantially alter their color, have the fastness properties referred to above. By heating the water solution of the dyestuff with chromating agents, for instance, chromium fluoride, in the presence of an acid binding agent, complex chromium compounds of the dyestuff are formed. The chromium compounds of the dyestuff obtained from 2-amino-5-dimethylamino-4'-hydroxydiphenylsulfon-3'-carboxylic acid and 2-amino-8-hydroxynaphthalene-6-sulfonic acid dyes wool from a sulfuric acid bath a fast violet color. By coupling the diazo compound of 2-amino-5-di-ethylamino-4'-hydroxy-diphenyl-sulfon-3'-carboxylic acid in acetic acid in the presence of sodium acetate with 1.8-dihydroxy-naphthalene-3.6-disulfonic acid a dyestuff is produced which dyes wool from an acid bath a blue color which dyeing, after being treated with chromium fluoride, is a fast blue.

We claim:

1. As a new product the mordant dyestuff which in the form of its free acid has the formula:

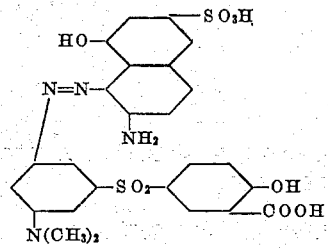

being a dark violet powder, readily soluble in water, dyeing wool from an acid bath violet shades which after chroming are fast to fulling and carbonizing.

2. As new products the mordant dyestuffs of the general formula:

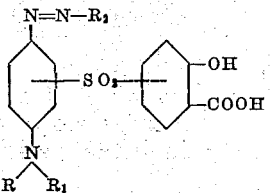

wherein R and $R_1$ represent alkyl and $R_2$ represents the residue of a coupling component of the naphthalene series, said dyestuffs being generally dark powders readily soluble in water and in sulfuric acid, dyeing chrome mordanted wool red to blue to violet shades of excellent fastness properties to soaping and to fulling.

3. As new products the mordant dyestuffs of the general formula:

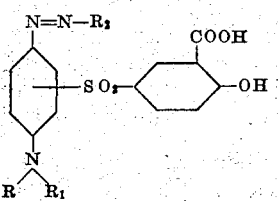

wherein R and $R_1$ represent alkyl and $R_2$ stands for the residue of a coupling component of the naphthalene series, said dyestuffs being generally dark powders, readily soluble in water and in sulfuric acid, dyeing chrome mordanted wool red to blue to violet shades of excellent fastness properties to soaping and to fulling.

In testimony whereof, we affix our signatures.

WILHELM NEELMEIER.
WINFRID HENTRICH.

Certificate of Correction

Patent No. 1,803,202.                                                                 Granted April 28, 1931, to

WILHELM NEELMEIER AND WINFRID HENTRICH

It is hereby certified that error appears in the printed specification of the above-numbered patent requiring correction as follows: Page 2, lines 27 to 37 and 72 to 80, claim 1, strike out the formula and insert the following:

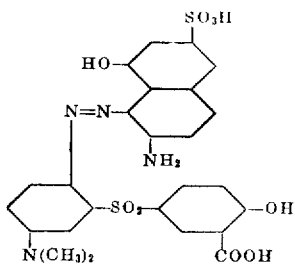

and that the said Letters Patent should be read with these corrections therein that the same may conform to the record of the case in the Patent Office.

Signed and sealed this 21st day of July, A. D. 1931.

[SEAL.]

M. J. MOORE,
*Acting Commissioner of Patents.*